United States Patent
Shi et al.

(10) Patent No.: US 7,885,470 B2
(45) Date of Patent: Feb. 8, 2011

(54) METHOD AND APPARATUS FOR STEGANALYSIS FOR TEXTURE IMAGES

(75) Inventors: Yun-Qing Shi, Millburn, NJ (US); Chunhua Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1056 days.

(21) Appl. No.: 11/624,816

(22) Filed: Jan. 19, 2007

(65) Prior Publication Data

US 2008/0175429 A1 Jul. 24, 2008

(51) Int. Cl.
*G06K 9/36* (2006.01)
(52) U.S. Cl. ...................................... 382/232; 382/100
(58) Field of Classification Search ................. 382/100, 382/232
See application file for complete search history.

(56) References Cited

U.S. PATENT DOCUMENTS

| | | | | |
|---|---|---|---|---|
| 5,778,102 A | * | 7/1998 | Sandford et al. | 382/251 |
| 6,192,139 B1 | * | 2/2001 | Tao | 382/100 |
| 6,831,991 B2 | * | 12/2004 | Fridrich et al. | 382/100 |
| 7,239,717 B2 | * | 7/2007 | Fridrich et al. | 382/100 |
| 2007/0104325 A1 | * | 5/2007 | Lee | 380/37 |

OTHER PUBLICATIONS

Fridrich: Feature-based steganalysis for JPEG images and Its implications for future design of steganographic schemes, Springer-Verlag, pp. 67-81, 2004.*
Xuan et al: "Steganalysis based on multiple features formed by statistical moments of wavelet characteristic function", Spinger-Verlag, pp. 262-277, 2005.*
Lyu et al: "Detecting hiding messages using higher-order statistics and support vector machines", Lecture notes in computer science, 2003, Springer.*
Harmsen et al: "Kernel Fisher discriminant for steganalysis of JPEG hiding methods", ACM Multimedia and Security, 2005.*
Sullivan et al: "Steganalysis for Markov cover data with application to images", IEEE-IFS, 2006.*

(Continued)

*Primary Examiner*—Samir A Ahmed
*Assistant Examiner*—Ruiping Li
(74) *Attorney, Agent, or Firm*—Connolly Bove Lodge & Hutz LLP (57) ABSTRACT

Embodiments of the invention are directed toward methods for steganalysis that improve the detection of steganography in texture images. The methods combine features extracted from the image spatial representation and from a block discrete cosine transform (BDCT) representation with multiple different block sizes (i.e., N×N) to improve detection of data hidden in texture images. Image data that is to undergo steganalysis can be provided to embodiments of the invention in at least one of spatial (pixel) and JPEG format. When JPEG format is provided, the image is first decompressed to spatial representation, from which the features are extracted when the block size is at least one 2×2, 4×4, and 16×16. When the block size is 8×8, the JPEG coefficients (JPEG quantized 8×8 BDCT coefficients) derived directly from the JPEG image are used to extract features. In addition, the method is also effective as a universal steganalyzer for both texture and smooth/non-texture images. Embodiments of the invention also (1) utilize moments of 1-D and 2-D characteristic functions; (2) Prediction-error; and (3) all wavelet subbands including the low-low subbands.

36 Claims, 7 Drawing Sheets

OTHER PUBLICATIONS

Jackson: "Detecting novel steganography with an anomaly-based strategy", J. of Electronic images, 2004.*

Ang et al, "Video compression makes big gains", IEEE, 1991, pp. 16-19.*

L. Barford et al.: "an Introduction to Wavelets" Sep. 1992, Hewlett Parkard (HPL-92-124) h- Instruments and Photonics Laboratory, XP002493744 p. 2, paragraph 2-p. 3, paragraph 1 p. 6, paragraph 1.

Wo 2006/0813386 A (Mak Aquisitions LLC [US]; Shi Yun-Qing [US]; Xuan Guorong [CN]) Aug. 3, 2006 p. 5, line 7-line 17.

Livens S et al: "Wavelets for texture analysis, an overview" Image Processing and Its Applications Sixth International Conference on , Dublin, Ireland Jul. 14-17, 1997, IEE, UK, vol. 2, Jul. 14, 1997, pp. 581-585, XP006508359 abstract.

Harmen: "Steganalysis of Additive Noise Modelable Information Hiding" Thesis, Rensselaer Polytechnic Institute, Troy, New York, USA, Apr. 1, 2003, pp. 1-49, XP003014096 p. 32, paragraph 3-p. 34, paragraph 1.

Siwei Lyu et al: "Detecting hidden messages using higher-order statistics and support vector machines" Information Hiding. 5Th International Workshop, IH 2002. Revised Papers (Lecture notes in Computer Science vol. 2578) Springer Verlag Berlin, Germany, 2002, pp. 340-354, XP002493743 p. 341, paragraph 2-paragraph 3.

The Written Opinion of the International Searching Authority issued on Sep. 15, 2008 in related international application Serial No. PCT/US2008/051384.

International Preliminary Report on Patentability issued in related International Application No. PCT/US2008/051384.

G. Xuan et al., "Steganalysis Based on Multiple Features Formed by Statistical Moments of Wavelet Characteristic Functions," *Information Hiding Workshop (IHW 05)*, Barcelona, Spain, Jun. 2005.

Y.Q. Shi et al., "Steganalysis Based on Moments of Characteristic Functions Using Wavelet Decomposition, Prediction-Error Image, and Neural Network," *IEEE International Conf. on Multimedia and Expo (ICME 05)*, Amsterdam, Netherlands, Jul. 2005.

C. Chen et al., "Statistical Moments Based Universal Steganalysis Using JPEG 2-D Array and 2-D Characteristic Function," *IEEE Int'l Conf. on Image Processing (ICIP 06)*, Atlanta, Georgia, Oct. 2006.

M. Weinberger et al., "LOCO-I: A Low Complexity Content-Based Lossless Image Compression Algorithm," *Proc. of IEEE Data Compression Conf.*, pp. 140-149, 1996.

* cited by examiner

METHOD AND APPARATUS FOR STEGANALYSIS FOR TEXTURE IMAGES

BACKGROUND OF THE INVENTION

1. Field of the Invention

Embodiments of the invention relate to steganography. Steganography is the art and science of secret communication, whose purpose is to hide the very presence of information in content such as images, video, and audio. Steganalysis is the art and science of detecting information hidden in content (e.g., images, video and audio) through the use of steganography. In particular, embodiments of the invention relate to the detection of hidden information in texture images.

2. Description of Background Art

The goals of steganalysis are to: (1) identify suspect content; (2) detect whether or not the content has embedded information; and, (3) if possible, recover that information. Steganalysis is complicated primarily by four things: the suspect images may or may not have any information embedded into them in the first place; the information, if any, may have been encrypted before being embedded into the content; some of the suspect content may have had noise or irrelevant data embedded into them (which reduces stealth but can make steganalysis very difficult); and unless you can completely recover, decrypt, and inspect the information, you often can't be sure whether you really have content that is being used for transport of hidden information or not.

Images are one form of content in which information may be hidden. Since images are diverse and there are wide variations in data embedding approaches, effective methods for steganalysis can be particularly difficult to implement for images. However, since the cover medium has been modified by the step of embedding information, a cover image and an associated steganographic (stego) version of the cover image (i.e., the cover image with embedded information) generally will differ in some respect.

In particular, reliable steganalysis of texture images, which have characteristics that are different from smooth (i.e., non-texture) images, has proven difficult. Specifically, texture images have characteristics that are similar to noise. As a result, the embedded information is submerged in noise, and when methods for steganalysis are applied to texture images the embedded information is often very hard to detect with background art methods for steganalysis that were not developed with the characteristics of texture images in mind.

Our own background art methods for steganalysis, which are hereby incorporated by reference, are described in G. Xuan, Y. Q. Shi, J. Gao, D. Zou, C. Yang, Z. Zhang, P. Chai, C. Chen, W. Chen, "Steganalysis Based on Multiple Features Formed by Statistical Moments of Wavelet Characteristic Functions", *Information Hiding Workshop* 2005, Barcelona, Spain, June 2005; and Y. Q. Shi, G. Xuan, D. Zou, J. Gao, C. Yang, Z. Zhang, P. Chai, W. Chen, C. Chen, "Steganalysis Based on Moments of Characteristic Functions Using Wavelet Decomposition, Prediction-Error Image, and Neural Network", *IEEE International Conference on Multimedia & Expo* 2005, Amsterdam, Netherlands, July, 2005 (hereinafter Shi et al.). Our background art methods perform well on standard smooth image datasets, say, CorelDraw™ image dataset. However, the performance of our background art methods deteriorates dramatically for texture images and thus, these background art methods are not satisfactory for steganalysis for texture image applications.

Other examples of background art that do not provide the desired level of performance for detection of information in texture images include: J. Fridrich, "Feature-based steganalysis for JPEG images and its implications for future design of steganographic schemes," *6th Information Hiding Workshop*, Toronto, ON, Canada, 2004 (hereinafter Fidrich); H. Farid, "Detecting hidden messages using higher-order statistical models", *International Conference on Image Processing*, Rochester, N.Y., USA, 2002, (hereinafter Farid); C. Chen, Y. Q. Shi, W Chen, "Statistical Moments Based Universal Steganalysis Using JPEG 2-D Array and 2-D Characteristic Function", *IEEE International Conference on Image Processing* 2006, Atlanta, Ga., USA, Oct. 8-11, 2006 (hereinafter Chen et al.); D. Zou, Y. Q. Shi, W. Su, G. Xuan, "Steganalysis based on Markov model of thresholded prediction-error image", *IEEE International Conference on Multimedia and Expo*, Toronto, ON, Canada, Jul. 9-12, 2006 (hereinafter Zou et al.); and Y. Q. Shi, C. Chen, W. Chen, "A Markov Process Based Approach to Effective Attacking JPEG Steganography", *Information Hiding Workshop* 2006, Old Town Alexandria, Va., USA, Jul. 10-12, 2006 (hereinafter Shi et al. II).

Additionally, recognition that background art methods for steganalysis have difficulty detecting information in texture images has also been reported in R. Bohme, "Assessment of Steganalytic Methods Using Multiple Regression Models", *Information Hiding Workshop* 2005, Barcelona, Spain, June 2005 (hereinafter Bohme). In particular, Bohme found that images with noisy textures yield the least accurate detection results when two other exemplary background art methods for steganalysis: "Regular-Singular (RS)" and "Weighted Stego Image (WS)" are used. Therefore, there is clearly a need in the art for improved methods for steganalysis for texture images.

SUMMARY OF THE INVENTION

Embodiments of the invention are directed at overcoming the foregoing and other difficulties encountered by the background arts. In particular, embodiments of the invention provide improved methods for steganalysis that combine features extracted from the spatial representation; and the computation of multiple block discrete cosine transform (BDCT) with different block sizes.

In addition, embodiments of the invention provide a steganalysis framework that combines the features from the spatial representation, from the BDCT coefficient representation, and from the JPEG coefficient representation for JPEG images. Embodiments of the invention also combine features from the 1-D characteristic function, the 2-D characteristic function, moments and the discrete wavelet transform.

Further, images for steganalysis used by embodiments of the invention can be provided by, but are not limited to: raw images and JPEG images. If the given image is in JPEG format, the image is decompressed to the spatial representation and feature extraction is performed by BDCTs with block sizes of at least 2×2, 4×4, and 16×16. For JPEG images, if the block size is 8×8, the JPEG coefficients (i.e., the JPEG quantized 8×8 BDCT coefficients) are derived directly from the given JPEG image and are used for feature extraction.

Furthermore, embodiments of the invention can be used as an effective universal steganalyzer for both texture and non-texture images. That is, embodiments of the invention can provide an effective universal steganalysis framework that combines features extracted from the spatial representation and from the BDCT representation with different block sizes. Moreover, various embodiments of the invention provide improved steganalysis capability that can be applied to improve detection of information in texture images.

One exemplary embodiment of the invention is a method for steganalysis of an image comprising: inputting a two-dimensional (2-D) spatial representation of the image; generating non-overlapping, N×N block decompositions of the spatial representation of the image; applying a block discrete cosine transform (BDCT) to each of the non-overlapping, N×N block decompositions; determining BDCT coefficient arrays derived from the coefficients of all non-overlapping, N×N block decompositions; extracting moments of a characteristic function from the spatial representation of the image and each of the BDCT coefficient 2-D arrays; generating features based at least on the extracted moments of the characteristic function; and classifying the image based at least on the generated features. Preferably, in an exemplary embodiment of the invention: the block size N×N, with N being at least one of 2, 4, 8 and 16.

Another exemplary embodiment is a method for steganalysis of an image comprising: inputting a JPEG representation of the image; performing a JPEG decompression of the JPEG representation; reconstructing a spatial representation of the image from the JPEG decompression; performing entropy decoding of the JPEG representation; re-ordering the entropy decoded JPEG representation; generating non-overlapping, N×N block decompositions of the spatial representation of the image; applying block discrete cosine transform (BDCT) to each of the non-overlapping, N×N block decompositions; determining BDCT coefficient 2-D arrays; forming 8×8 JPEG coefficients from the re-ordering of the entropy decoding of the JPEG representation; extracting moments of a characteristic function from the BDCT coefficient 2-D arrays and 8×8 JPEG coefficients; generating features based at least on the extracted moments of the characteristic function; and classifying the image based at least on the generated features.

Yet another exemplary embodiment of the invention is a processor-readable medium containing software code that, when executed by a processor, causes the processor to implement a method for steganalysis of an image comprising: inputting a two-dimensional (2-D) spatial representation of the image; generating non-overlapping, N×N block decompositions of the spatial representation of the image; applying block discrete cosine transform (BDCT) to each of the non-overlapping, N×N block decompositions; determining BDCT coefficient 2-D arrays for each N×N block; extracting moments of a characteristic function from the spatial representation of the image and each of the BDCT coefficient 2-D arrays; generating features based at least on the extracted moments of the characteristic function; and classifying the image based at least on the generated features.

Another exemplary embodiment is a processor-readable medium containing software code that, when executed by a processor, causes the processor to implement a method for steganalysis of an image comprising: inputting a JPEG representation of the image; performing a JPEG decompression of the JPEG representation; reconstructing a spatial representation from the JPEG decompression; performing entropy decoding of the JPEG representation; generating non-overlapping, N×N block decompositions of the spatial representation of the image; applying block discrete cosine transform (BDCT) to each of the non-overlapping, N×N block decompositions; determining BDCT coefficient 2-D arrays; forming 8×8 JPEG coefficient from the re-ordering of the entropy decoding of the JPEG representation; extracting moments of a characteristic function from the BDCT coefficient 2-D arrays and 8×8 JPEG coefficients; generating features based at least on the extracted moments of the characteristic function; and classifying the image based at least on the generated features.

Yet another exemplary embodiment further comprises: determining a prediction error for at least one of the spatial representation 2-D array, the BDCT coefficient 2-D arrays and the JPEG coefficient 2-D arrays; computing a wavelet transform for at least one of the spatial representation 2-D array of the image, the BDCT coefficient 2-D arrays, the JPEG coefficient 2-D array and the prediction error; determining histograms of the wavelet subbands; determining at least one of horizontal, vertical, diagonal and minor diagonal 2-D histograms from at least one of the spatial representation 2-D array of the image, the BDCT coefficient 2-D arrays and the JPEG coefficient 2-D array; applying a discrete Fourier transform (DFT) to the histograms; applying a 2-D DFT to the 2-D histograms; determining at least one of the first order, second order and third order moments from the characteristic function (i.e., with the discrete Fourier transform of the histogram); and determining at least one of the first order, second order and third order marginal moments from the characteristic function; and generating features based at least on the moments.

Preferably, the wavelet transform of the above-discussed exemplary embodiments uses a one-level discrete wavelet transform. Alternatively, two-level and three-level discrete wavelet transforms can be used. In addition, in these exemplary embodiments, the wavelet transform is at least one of a Haar wavelet, Daubechies 9/7 wavelet and integer 5/3 wavelet.

Another exemplary embodiment of the invention is a method further comprising: computing sign and magnitude for at least one of the spatial representation 2-D array of the image, the BDCT coefficient 2-D arrays and the JPEG coefficient 2-D arrays; computing an expression $|a|+|b|-|c|$; and determining the product of the expression and the sign.

Yet another embodiment of the invention is an apparatus comprising: means for generating features based at least in part on moments of a characteristic function of said image; and means for classifying said image based at least in part on said generated features. Preferably said means for generating features comprises means for generating features based at least in part on moments of a set of decomposition of images. Preferably said set of decomposition of images is based at least in part on at least one of the discrete wavelet transform or the Haar wavelet transform. Preferably, the means for classifying comprises a means for classifying an image as either a stego-image or a non-stego image. Preferably said means for generating features includes means for generating a prediction error based at least in part on said image.

Another embodiment of the invention is an apparatus comprising: means for applying a trained classifier to an image; and means for classifying said image based at least in part on applying a trained classifier to a host of features generated from said image. Preferably, the means for classifying comprises means for classifying based at least in part on applying a trained classifier comprising at least one of a trained Support Vector Machine (SVM) classifier, a trained neural network classifier and a trained Bayes classifier. Preferably, the means for classifying includes means for classifying based at least in part on a host of features generated from a prediction error of said image.

DETAILED DESCRIPTION OF THE INVENTION

As discussed above, texture images are generally noisy. As a result, when background art methods for steganalysis are applied to texture images, the embedded signal is submerged in noise and is very difficult to detect. A detailed description/definition of "texture" suggests: "[t]he notion of texture appears to depend upon three ingredients: (1) some local 'order' is repeated over a region which is large in comparison to the order's size; (2) the order consists in the nonrandom arrangement of elementary parts; and (3) the parts are roughly uniform entities having approximately the same dimensions everywhere within the textured region," and was given in J. K. Hawkins, "Textural Properties for Pattern Recognition", *Picture Processing and Psychopictoris*, B. C. Lipkin and A. Rosenfeld (editors), Academic Press, New York, 1970, pp 347-370. In addition, the term "texture is used to describe two dimensional arrays of variations" in R. M. Pickett, "Visual Analysis of Texture in the Detection and Recognition of Objects", *Picture Processing and Psychopictories*, B. C. Lipkin and A. Rosenfeld (editors), Academic Press, New York, 1970, pp 198-216.

As mentioned in the Background Art section above, our background art method for steganalysis, as reported in Shi et al., works quite well on smooth CorelDraw™ images but almost fails on texture images. The reason for why this is the case is analyzed in the following paragraphs. This reasoning is further supported by the experimental results given in Table 1 to Table 4, which are also discussed below.

The method in Shi et al. is based on the moments of the characteristic function (i.e., the Fourier transform of the histogram) of an image, which are given by:

$$M_n = \frac{\sum_{i=1}^{N/2} x_i^n |H(x_i)|}{\sum_{i=1}^{N/2} |H(x_i)|}, \quad (1)$$

where $H(x_i)$ is the characteristic function (CF) component at frequency $x_i$ and N is the total number of different value level of image pixels (e.g., N=256 for 8-bit images). In S. Qian, D. Chen, *Joint Time-Frequency Analysis—Methods and Applications*, Prentice Hall, 1996, the first order moment (i.e., n=1 in Equation (1)) of the CF of the histogram is also referred to as the mean instantaneous frequency (MIF) of the histogram. It has proven, for example in: G. Xuan, Y. Q. Shi, J. Gao, D. Zou, C. Yang, Z. Zhang, P. Chai, C. Chen, W. Chen, "Steganalysis Based on Multiple Features Formed by Statistical Moments of Wavelet Characteristic Functions", *Information Hiding Workshop* 2005, Barcelona, Spain, June 2005], that after information has been embedded into an image, the above defined moments will decrease or remain the same under the assumption that: (1) the embedded information (or hidden data) is additive to and independent of the cover image; and (2) the CF has a distribution such that its magnitude is non-increasing from 1 to N/2.

In addition, under the above assumptions, the additive information embedding of steganography acts as a low pass filtering process on the image histogram. Further, with respect to the use of the same embedded information and the same embedding process, it is observed from our experiments on two image databases (i.e., CorelDraw™ image database and the 798 texture images) that after information is embedded, the MIF of the histogram of images with a higher MIF will decrease more than that of the histogram of images with a lower MIF.

Figure 1A:
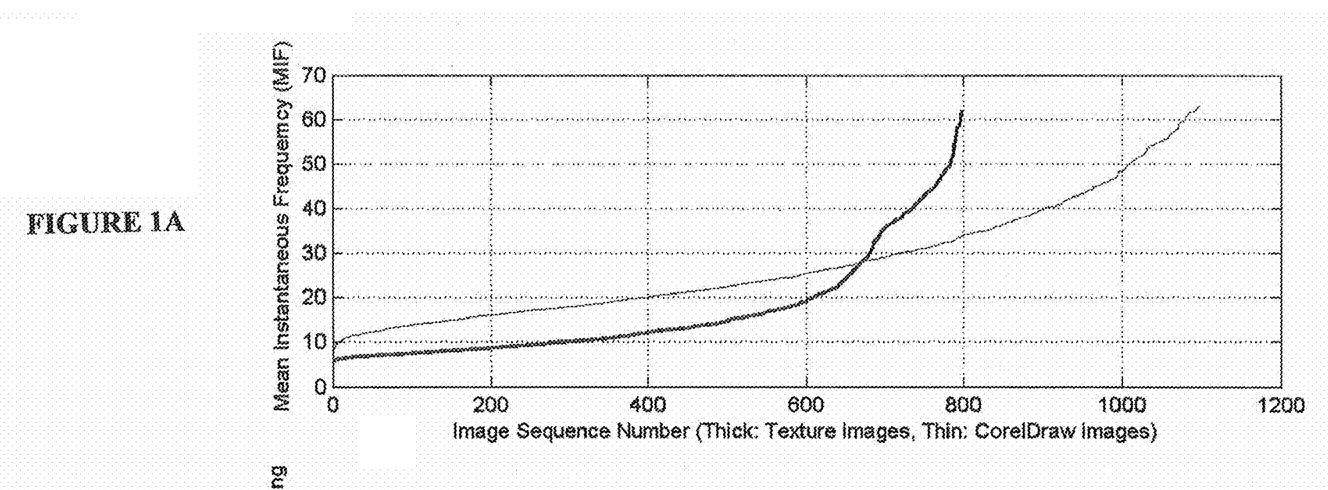
FIG. 1A illustrates a graph comparing the mean instantaneous frequency (MIF) of CorelDraw™ images and the MIF of texture images without data embedding where each is represented as thick and thin lines, respectively, on the graph.

FIG. 1A illustrates graphs comparing the MIF of the smooth CorelDraw™ images and the MIF of texture images, each of which is represented on the graphs as thin and bold lines, respectively. The mean value of the MIFs for the smooth CorelDraw™ images and for the texture images are 27.5 and 16.9, respectively. That is, the mean values of the MIFs for the smooth CorelDraw™ images are clearly higher than for the texture images.

Figure 1B:
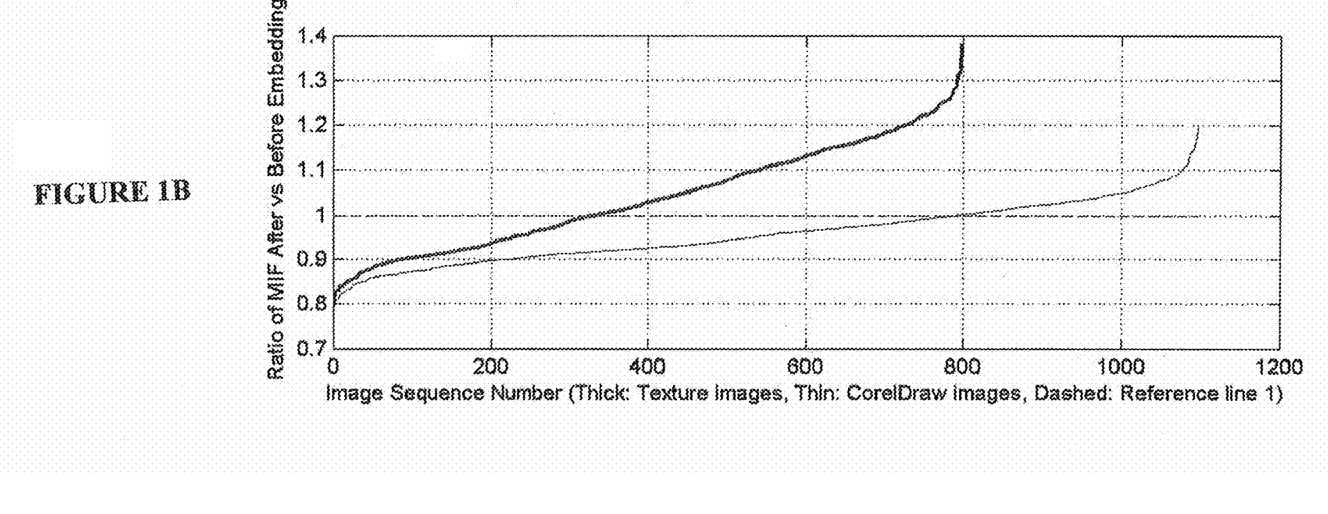
FIG. 1B illustrates a graph comparing the ratio of the MIF of a stego image to the MIF of the cover image for the CorelDraw™ image database and the ratio for texture images where each is represented as thick and thin lines, respectively, on the graph.

FIG. 1B illustrates graphs of the ratio of the MIF of the stego version of the cover image (i.e., a generic Least Significant Biplane (LSB), 0.3 bits per pixel (bpp)) to the MIF of the cover image for both the CorelDraw™ images and the texture images, which are represented on the graphs as thin and bold lines, respectively. The mean value of the ratios for the CorelDraw™ images and for the texture images are 0.96 and 1.04, respectively. This curve is related to the observation discussed above. That is, with respect to the use of the same embedded information and the same embedding process, after information embedding, the MIF of the histogram of images with a higher MIF will decrease more than that of the histogram of images with a lower MIF.

As discussed above, the smooth CorelDraw™ images have higher MIFs than the texture images before information embedding and the relative decrease in the value of the MIFs of the smooth CorelDraw™ images is larger than that of the texture images. This difference in the decrease of the MIFs after data embedding indicates the separation of the cover images from the stego version of the cover images is larger and hence the steganalysis is easier for the smooth CorelDraw™ images. Further, this suggests that the larger separation between the cover image and stego version of the cover image with smooth images is the reason for background art methods for steganalysis to perform better on the smooth CorelDraw™ images than on the texture images.

In order to improve the performance of methods for steganalysis for texture images, one embodiment of the invention computes moments generated from BDCT representations with different block size to enhance the capability of steganalysis. In particular, embodiments of the invention exploit the concept that the moments of the CF of the histogram of the BDCT coefficient 2-D arrays decreases or remains the same after embedding information under the assumption that the embedded information is additive to and independent of the cover image, and with such a distribution, the magnitude of the CF of the transformed embedded signal is non-increasing from 1 to N/2 (where N is the total number of different value levels of BDCT coefficients). In addition, the moments of 2-D characteristic functions may also be included. Currently, the advanced steganographic schemes aim at keeping the 1-D histogram of the image unchanged as much as possible during data embedding. Consequently, the 1-D histogram and hence the moments of 1-D characteristic function may vary very little after data embedding By exploiting moments derived from 2-D characteristic function (the DFT of 2-D histogram), these steganographic schemes may be detected.

Figure 2A:
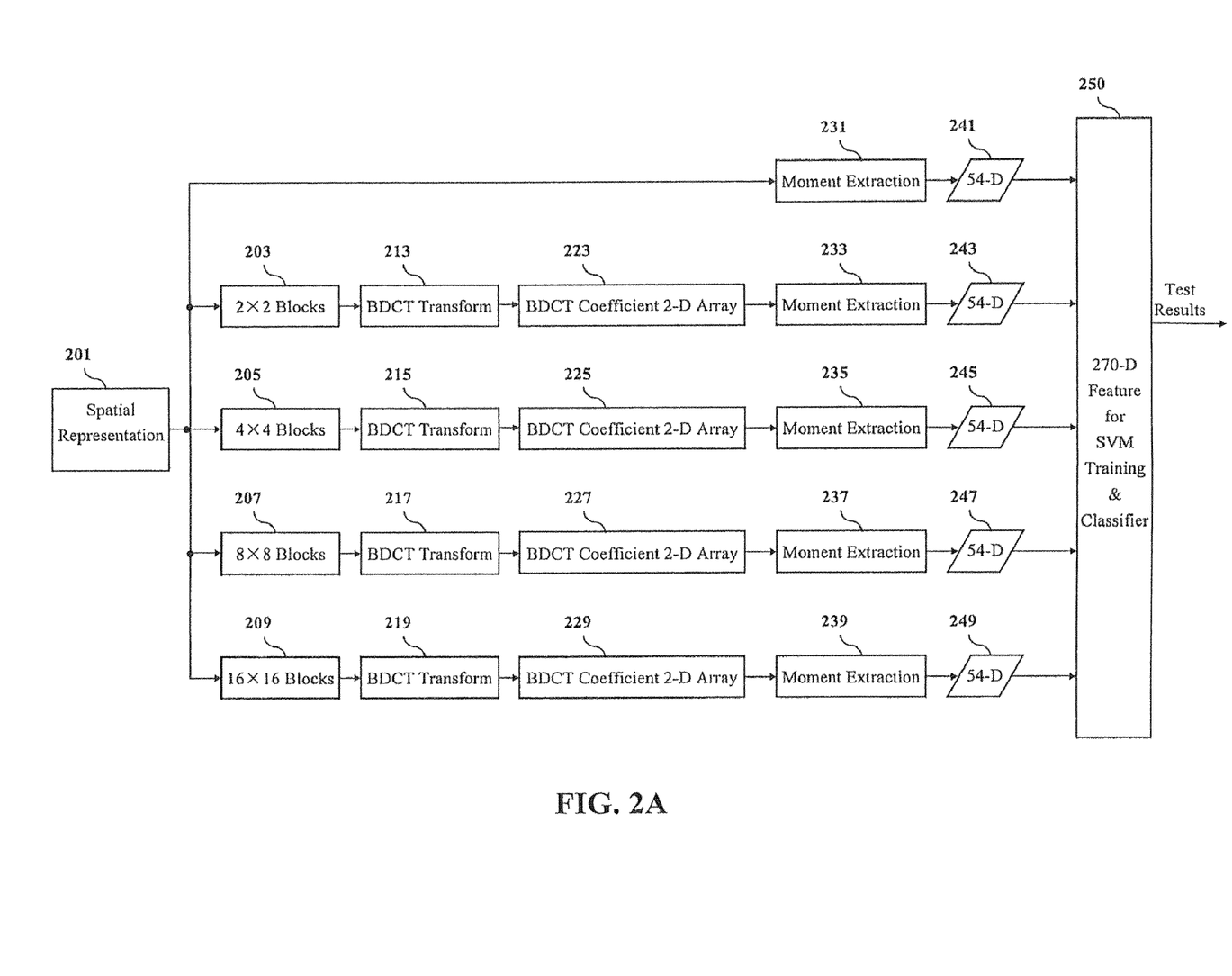
FIG. 2A illustrates a block diagram of an exemplary embodiment of the Feature Generation method of the invention for a spatial representation.

FIG. 2A illustrates a block diagram of an exemplary method for the Feature Generation. In particular, FIG. 2A shows a spatial representation 201 of suspect image data is provided as an input to a Moment Extraction function 231 and as an input to multiple N×N block decompositions 203, 205, 207, 209 of the spatial representation 201 of the suspect image data where N=2, 4, 8, and 16. The N×N block decompositions of the image data are input to BDCT 213, 215, 217, 219. Computation of the BDCT results in BDCT coefficient 2-D arrays 223, 225, 227, 229. The spatial representation 201 and BDCT coefficient 2-D arrays 223, 225, 227, 229 each provide inputs for a Moment Extraction function 231, 233, 235, 237, 239. The outputs from the Moment Extraction function 231, 233, 235, 237, 239 are each ultimately 54-Dimensional (54-D) feature vectors 241, 243, 245, 247, 249. Each of the 54-D feature vectors form a part of a final 270-Dimensional (270-D) feature vector that is input to the Support Vector Machine (SVM) trainer and classifier function block 250.

Figure 2B:
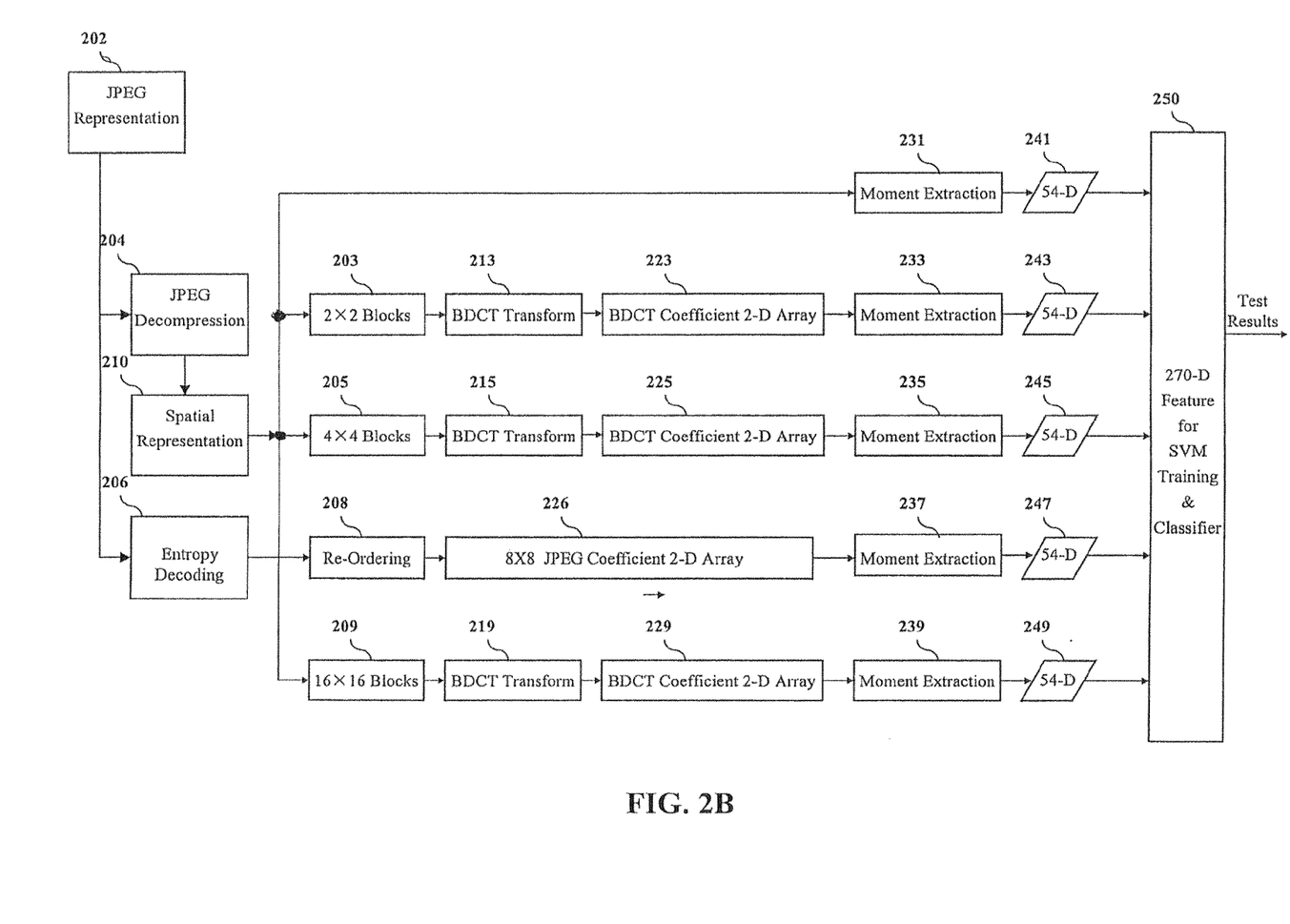
FIG. 2B illustrates another block diagram of an exemplary embodiment of the Feature Generation method of the invention for a JPEG representation.

FIG. 2B illustrates another block diagram of an exemplary embodiment of the Feature Generation method of the invention for JPEG images. In particular, FIG. 2B shows a JPEG representation 202 of the image data is provided as an input to both a JPEG decompression function 204 and Entropy Decoding function 206. The output of the JPEG decompression function 204 is provided as an input to a reconstruction function that reconstructs a spatial representation 210 of the image from the JPEG decompression. The spatial representation 210 of the image is provided as an input to the Moment Extraction function 231 and multiple, non-overlapping N×N block size decompositions 203, 205, 209 of the suspect image data, where N=2, 4, and 16. The output of the Entropy Decoding function 206 re-ordered by the Re-ordering function 208 and the re-ordered output is provided to the 8×8 JPEG coefficient 2-D Array 226. The Re-ordering function 208 is further discussed below.

The N×N block decompositions of the image data are input to BDCT functions 213, 215, 219. The outputs of the BDCTs 213, 215, 219 provide inputs for BDCT coefficient 2-D arrays 223, 225, 229. The JPEG Quantized coefficient 2-D array 226 and BDCT coefficient 2-D arrays 223, 225, 229 are each provide as inputs for Moment Extraction functions 237, 233, 235, 239. The outputs from the Moment Extraction function 231, 233, 235, 237, 239 are each ultimately 54-D feature vectors 241, 243, 245, 247, 249 which form a part of a final 270-D feature vector that is input to a Support Vector Machine (SVM) trainer and classifier.

A support vector machine (SVM) is used in the trainer and classifier function 250, as shown in FIG. 2A and FIG. 2B. A non-limiting example of such a SVM is given in: C. J. C. Burges. "A tutorial on support vector machines for pattern recognition", Data Mining and Knowledge Discovery, 2(2): 121-167, 1998] The polynomial kernel with degree two is used in our investigation and defined in C. C. Chang, C. J. Lin, LIBSVM: A Library for Support Vector Machines, 2001. http://www.csie.ntu.edu.tw/~cjlin/libsvm.

With regards to the decompression function 204 of FIG. 2B, the procedures for JPEG compression is described in the following paragraph. A given image is first partitioned into a set of non-overlapping 8×8 blocks. The 2-D BDCT is applied to each of these 8×8 blocks independently, resulting in 64 block DCT (BDCT) coefficients for each block. After thresholding and shifting, these BDCT coefficients are quantized with one of the JPEG quantization tables, resulting in integer valued BDCT coefficients. These quantized BDCT coefficients are then zigzag scanned within each 8×8 block so that the BDCT coefficients within each block become a 1-D sequence of integers. Since the quantization causes a large number of BDCT coefficients to become zero, the run-length coding becomes efficient in coding the positions of these non-zero coefficients. The run-length codes and those non-zero coefficients' magnitudes are entropy coded (e.g., often either Huffman code or arithmetic code), thus forming one JPEG file for the JPEG compressed image.

The JPEG decompression is a reverse process of the JPEG compression function discussed above. Hence, to form a 2-D array consisting of all of the JPEG quantized BDCT coefficients from all of the 8×8 blocks, as shown in FIG. 2B entropy decoding 206 needs to be applied so that we can obtain the non-zero coefficients' positions and magnitudes. Then, as shown in FIG. 2B, a re-ordering function 208 needs to be applied so that we can recover the 64 JPEG quantized BDCT coefficients' original locations within each 8×8 block. Specifically, a 1-D zigzag scanning re-ordering returns the coefficients back to the original ordering in the 8×8 block. The recovered JPEG coefficients from each block are then used in forming the 2-D array of JPEG coefficient 2-D array 226.

Figure 3:
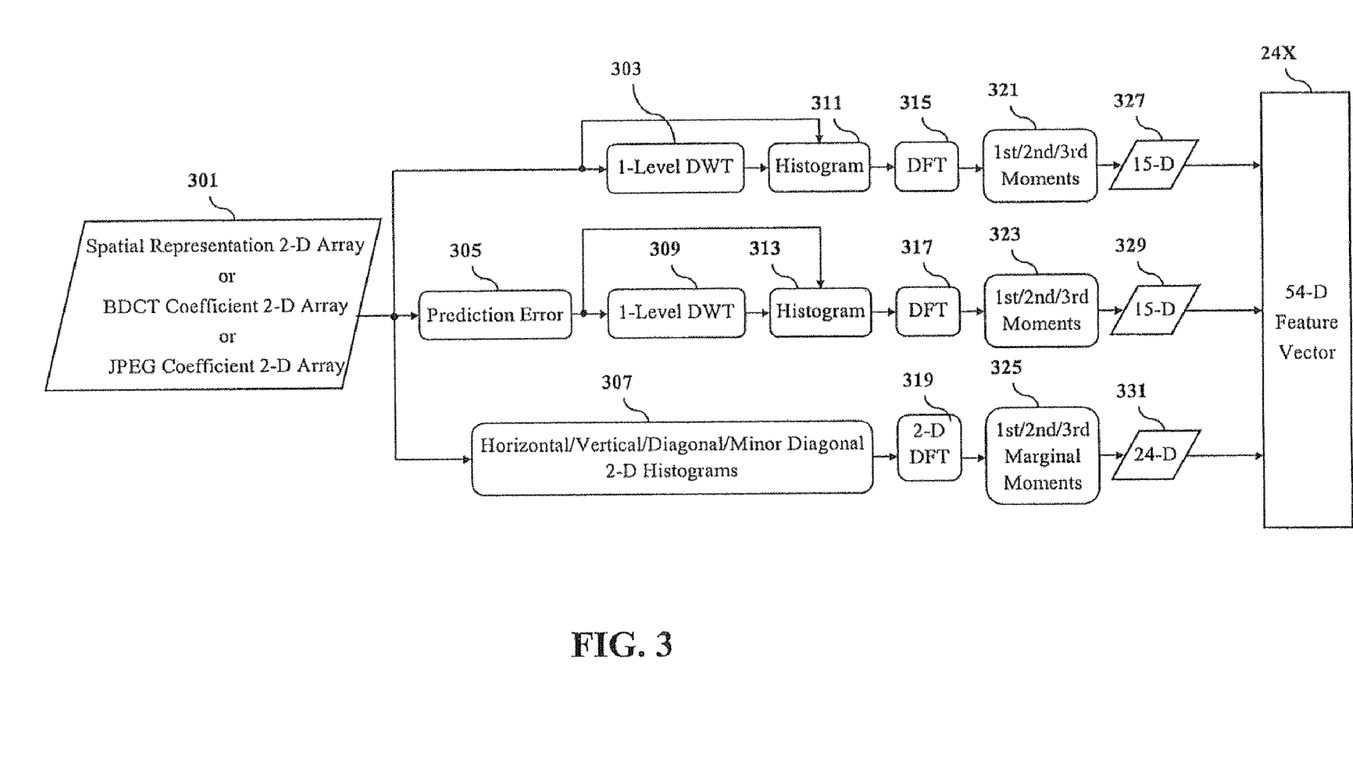
FIG. 3 illustrates a more detailed block diagram of an exemplary embodiment of the Moment Extraction function of FIG. 2.

FIG. 3 illustrates a block diagram of an exemplary method for Moment Extraction of the Feature Generation method shown in FIG. 2 (231, 233, 235, 237, 239). As shown in FIG. 3, two-dimensional arrays 301 of at least one of a spatial representation 2-D array, BDCT coefficient 2-D arrays and JPEG coefficient 2-D arrays are provided as inputs to at least a 1-level discrete wavelet transform (DWT) 303, a Prediction Error Function 305 and 2D-Histograms 307. The output of the Prediction Error Function 305 is further processed by at least a 1-level DWT 309. Histogram functions 311, 313 are computed for each of the 1-level DWT blocks 303, 309. These histogram functions 311, 313 outputs, as well as the 2-D histogram function 307 output provide input data to discrete Fourier Transform (DFT) function blocks 315, 317 and two-Dimensional DFT function block 319. First/Second/Third Moment function blocks 321, 323 are applied to the computed DFT function 315, 317. First/Second/Third Marginal Moment function block 325 is applied to a 2-D DFT function 319 output of the 2-D histogram function 307. The Moment functions 321, 323 outputs and Marginal Moment function 325 output are provided to the 15-dimensional (15-D) feature components 327, 329 and the 24-dimensional (24-D) feature component 331, respectively, of the 54-D feature vectors 241, 243, 245, 247, 249, as shown in FIG. 2A and FIG. 2B.

The moments of the CF of the histograms are given by Equation (1), as discussed above. For the spatial representation and each BDCT/JPEG coefficient representation, four second-order histograms (also referred to as 2-D histograms) are generated with the following four separations:

$$(\rho, \theta) = \{(1, 0), (1, -\frac{\pi}{2}), (1, -\frac{\pi}{4}), (1, \frac{\pi}{4})\}, \quad (2)$$

with the parameters ρ representing the distance between the pair of elements for which the two-dimensional histogram is considered, and θ representing the angle of the line linking these two elements with respect to the horizontal direction; which are called horizontal 2-D histogram, vertical 2-D histogram, diagonal 2-D histogram, and minor diagonal 2-D histogram, respectively. After applying the 2-D DFT 319 to the 2-D histograms 307, the marginal moments of 2-D CF's are calculated by:

$$M_{u,n} = \frac{\sum_{j=1}^{N/2}\sum_{i=1}^{N/2} u_i^n |H(u_i, v_j)|}{\sum_{j=1}^{N/2}\sum_{i=1}^{N/2} |H(u_i, v_j)|}, \quad M_{v,n} = \frac{\sum_{j=1}^{N/2}\sum_{i=1}^{N/2} v_j^n |H(u_i, v_j)|}{\sum_{j=1}^{N/2}\sum_{i=1}^{N/2} |H(u_i, v_j)|}, \quad (3)$$

where $H(u_i, v_j)$ is the 2-D CF component at frequency $(u_i, v_j)$ and N is the total number of different values of coefficients in a wavelet subband under consideration.

Figure 4A:
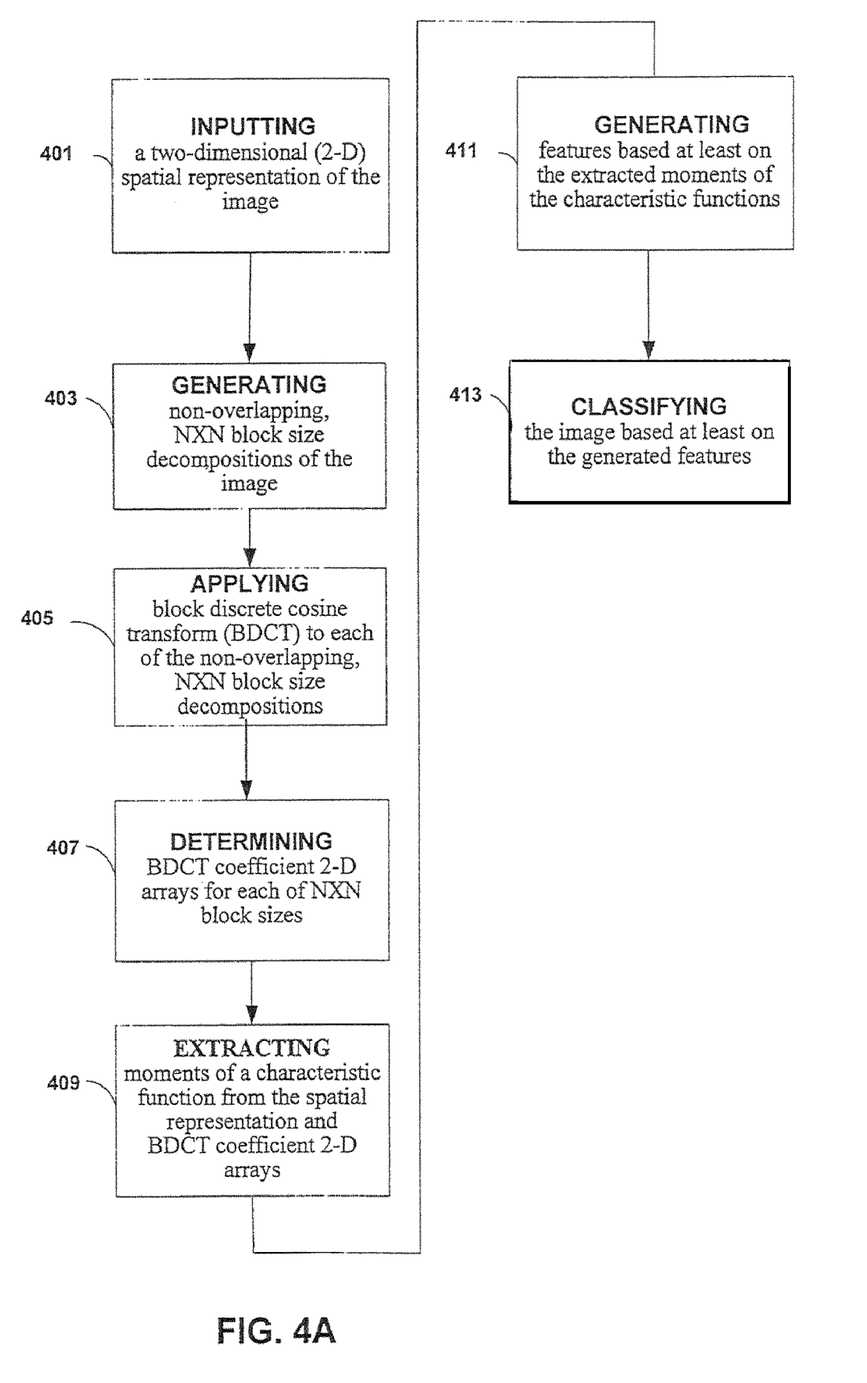
FIG. 4A is a flow diagram of an exemplary embodiment of a Feature Generation method of the invention in FIG. 2A.

FIG. 4A is a flow diagram of an exemplary embodiment of a method for steganalysis of a spatial representation of an image. In Step 401 of FIG. 4A, a two-dimensional (2-D) spatial representation of the image is given as an input to the method. Step 403 involves generating non-overlapping N×N block decompositions of the image. Applying a block discrete cosine transform (BDCT) to each of the non-overlapping N×N block decompositions is performed in Step 405. In Step 407, BDCT coefficient 2-D arrays for each of N×N block coefficients are determined. Step 409 involves extracting moments of a characteristic function from the spatial representation of the image and each of the BDCT coefficient 2-D arrays 223, 225, 227, 229. Generating features based at least on the extracted moments of the characteristic function occurs in blocks 231, 233, 235, 237, 239 at Step 411. In Step 413, classifying the image based at least on the generated features occurs. Moreover, in Step 413, we randomly select 5/6 of the cover/stego image pairs to train the SVM classifier and the remaining 1/6 pairs to test the trained classifier.

In implementing the flow diagram of FIG. 4A, a given spatial representation of an image is divided into non-overlapping N×N blocks. The two-dimensional (2-D) block discrete cosine transform (BDCT) is applied to each block independently. Denoting a formed image block by f(x,y),x,y=0, 1, . . . , N−1, the 2-D BDCT coefficient are given by:

$$F(u, v) = \frac{2}{N}\sum_{x=0}^{N-1}\sum_{y=0}^{N-1} \Lambda(x)\Lambda(y)\cos\frac{\pi u(2x+1)}{2N}\cos\frac{\pi v(2y+1)}{2N} f(x, y), \quad (4)$$

$$u, v = 0, 1, \ldots N-1,$$

where $$\Lambda(x) = \begin{cases} \frac{1}{\sqrt{2}}, & x = 0 \\ 1, & \text{otherwise} \end{cases} \quad (5)$$

With block size N×N, where N is equal to 2, 4, 8, and 16, are chosen accordingly.

Figure 4B:
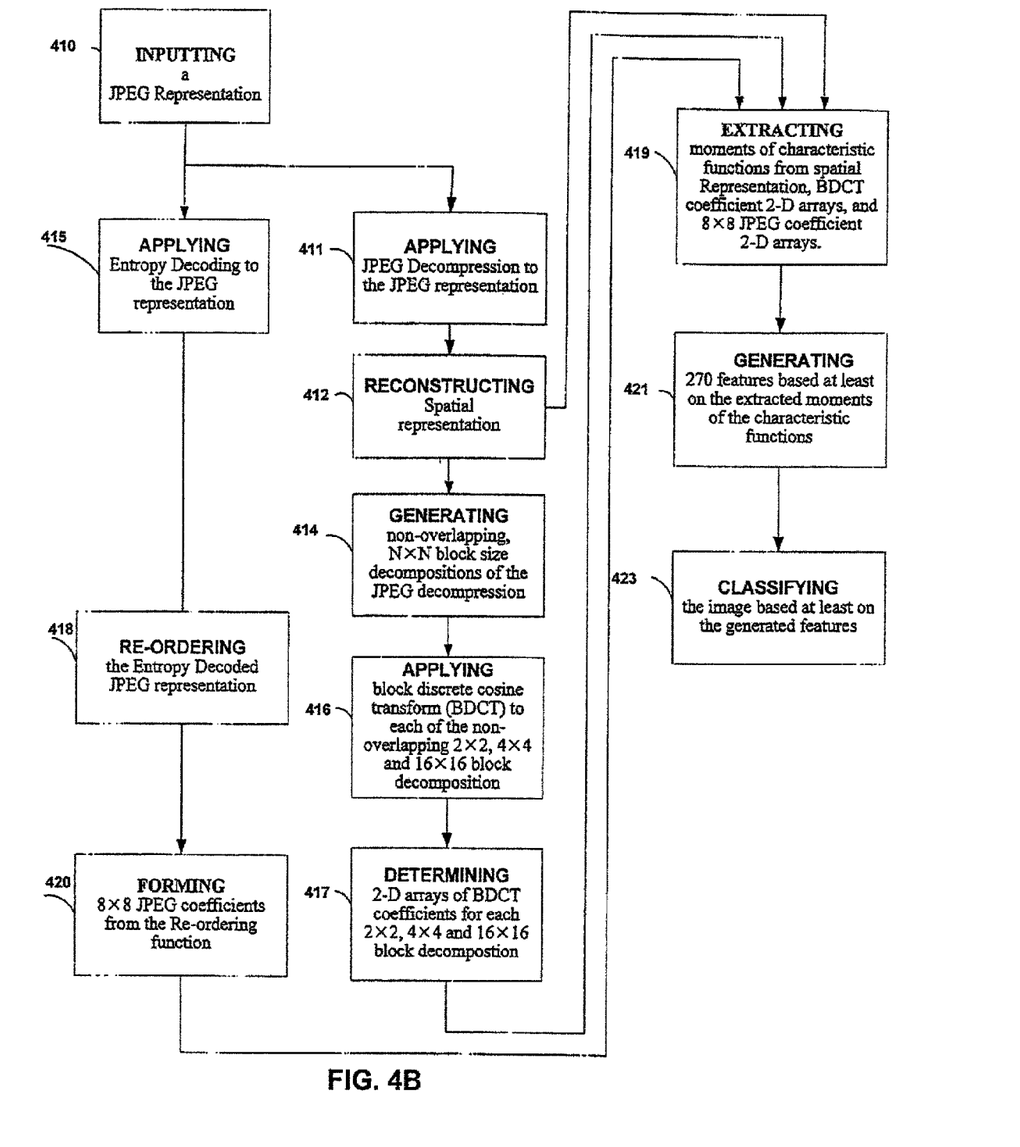
FIG. 4B is a flow diagram of an exemplary embodiment of a Feature Generation method of the invention in FIG. 2B.

FIG. 4B is a flow diagram of an exemplary embodiment of a method for steganalysis of a JPEG representation of an image. In Step 410 of FIG. 4B, a JPEG representation of an image is given as an input to the method. Applying a JPEG Decompression to the JPEG representation occurs in Step 411. Step 412 is the reconstruction of a spatial representation of the image from the JPEG Decompression. Step 414 involves generating non-overlapping N×N block decompositions of the image, where N=2, 4 and 16. Step 415 involves applying Entropy Decoding to the JPEG representation. Applying a block discrete cosine transform (BDCT) to each of the non-overlapping N×N block decompositions is performed in Step 416. In Step 417, 2-D arrays of coefficients for each BDCT of N×N blocks are determined. Step 418 is the re-ordering of the entropy decoded JPEG representation. In Step 420, the 8×8 JPEG coefficients for each 8×8 2-D array are formed from the Entropy Decoding 206. Step 419 involves extracting moments of a characteristic function from the spatial representation 210 of the image, BDCT coefficient 2-D arrays 223, 225, 229 and the JPEG coefficient 8×8 2-D array 226. Generating features based at least on the extracted moments of the characteristic function occurs in blocks 231, 233, 235, 237, 239 in Step 421. In Step 423, training and classifying the image based at least on the generated features occurs. Moreover, in Step 423, we randomly select 5/6 of the cover/stego image pairs to train the SVM classifier and the remaining 1/6 pairs to test the trained classifier.

In implementing the flow diagram of FIG. 4B, a given JPEG representation of an image is divided into non-overlapping N×N blocks. The two-dimensional (2-D) discrete cosine transform (DCT) is applied to each block independently. Denoting a formed image block by f(x,y),x,y=0, 1, . . . , N−1, the 2-D BDCT coefficient is given by: Equation (4) and Equation (5), as discussed above. N×N block sizes are used, where N is equal to 2, 4, and 16, are chosen accordingly.

Figure 5A:
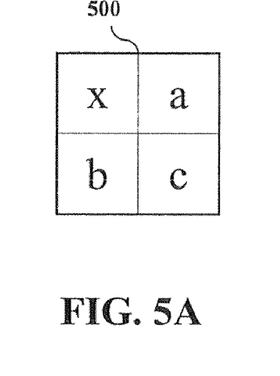
FIG. 5A illustrates an exemplary embodiment of a prediction context for the Prediction Error function of FIG. 3.

FIG. 5A illustrates an exemplary embodiment of a prediction context for the Prediction Error function 305 of FIG. 3. That is, in accordance with the prediction context, the method predicts the value of x using the values of its neighbors a, b, and c.

Figure 5B:
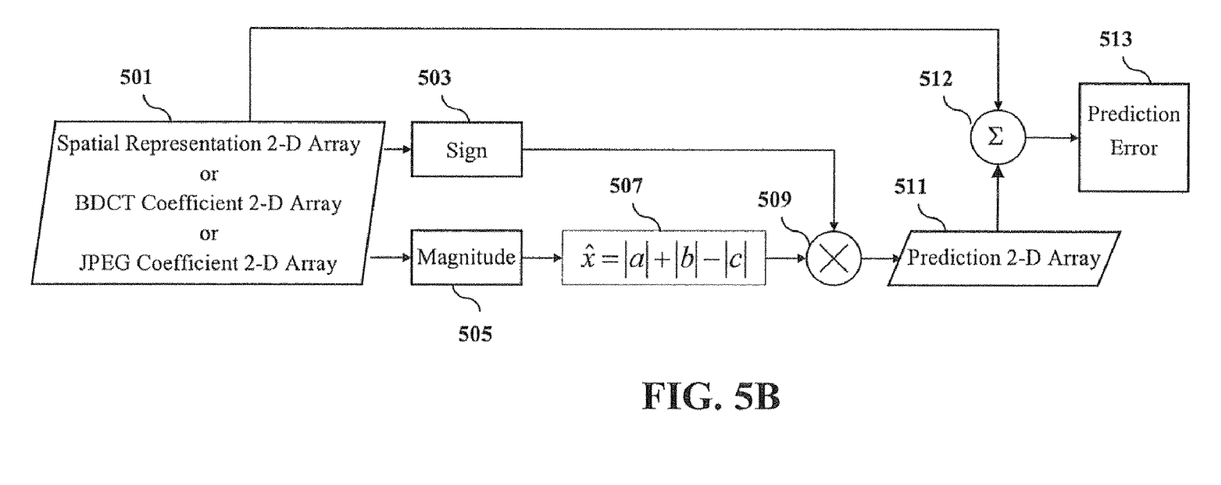
FIG. 5B illustrates a more detailed block diagram of an exemplary embodiment of Prediction Error generation of FIG. 3.

FIG. 5B illustrates a more detailed block diagram of an exemplary embodiment of the Prediction Error function 305 of FIG. 3. In addition, the prediction formula is given by Equation (6). As shown in FIG. 5B, 2-D arrays 501 of at least one of spatial representation, BDCT coefficients and JPEG coefficients are provided as inputs to both a sign determining function block 503 and a magnitude determining function block 505. The magnitude determining function block 505 provides input to a mathematical block 507 that calculates the mathematical expression: |a|+|b|−|c|. A multiplier 509 computes the product of the output of the sign determining block 503 and the mathematical block 505. The results from the multiplier 509 are then fed to a 2-D Prediction array block 511. The prediction error is the determined by the difference function 512 that computes the difference between at least one of a spatial representation/image/BDCT coefficient 2-D arrays/JPEG coefficient 2-D arrays 501 and the Prediction 2-D array 511.

$$\hat{x} = \text{sign}(x) \cdot \{|a| + |b| - |c|\}. \quad (6)$$

Considering the high dimensionality of the features leads to high computational complexity, we compute at least a one-level (1-level) discrete wavelet transform (DWT) in an exemplary embodiment of the invention. If we consider the spatial representation of the image, the BDCT coefficient 2-D array, or the JPEG coefficient 2-D array as $LL_0$, we have five subbands for a 1-level DWT decomposition. As compared to a 3-level DWT decomposition, the feature dimensionality of a 1-level DWT is reduced to 38%. The wavelet transform for this embodiment can be, but is not limited to the Haar wavelet transform, which is the simplest wavelet.

The experimental investigation results are reported in Table 1 to Table 4 below. The leftmost column in these tables lists the data embedding methods used to generate stego images. These data embedding methods are: (1) Marvel et al's Spread Spectrum Image Steganography (SSIS) as given in L. M. Marvel, C. G. Boncelet, Jr, C. T. Retter, "Spread Spectrum Image Steganography," *IEEE Trans. on Image Processing*, 8, pp. 1075-1083, August 1999 (0.1 bpp (bit per pixel); peak signal to noise ratio (PSNR) equal to 40 dB); (2) Cox et al.'s non-blind Spread Spectrum (SS) ($\alpha$=0.1), as found in I. J. Cox, J. Kilian, T. Leighton, T. Shamoon, "Secure Spread Spectrum Watermarking for Multimedia," *IEEE Trans. on Image Processing*, 6, 12, 1673-1687, 1997; (3) Piva et. al's blind SS, as found in A. Piva, M. Barni, E Bartolini, V. Cappellini, "DCT-based Watermark Recovering without Resorting to the Uncorrupted Original Image", *Proc. ICIP 97*, vol. 1, pp. 520; (4) Huang and Shi's 8×8 block SS, as found in J. Huang, Y. Q. Shi, "An adaptive image watermarking scheme based on visual masking," *IEE Electronic Letters*, vol. 34, no. 8, pp. 748-750, April 1998; (5a, 5b) generic LSB replacement (0.1 and 0.3 bpp; both the pixel position used for embedding data and the to-be-embedded bits are randomly selected), (6a, 6b) generic LSB modulation (0.1 and 0.3 bpp; both the pixel position used for embedding data and the to-be-embedded bits are randomly selected), (7) a generic Quantization Index Modulation (QIM) (0.1 bpp; step size=5), as found in B. Chen, G. W. Wornell, "Digital watermarking and information embedding using dither modulation," *Proceedings of IEEE MMSP* 1998, pp 273-278; (8a, 8b) MB1 (0.1 and 0.2 bpc (bits per non-zero BDCT AC coefficient), step size=2), as found in P. Sallee, "Model-based steganography," *International Work-shop on Digital Watermarking*, Seoul, Korea, 2003; (9a, 9b) F5 (0.1 and 0.2 bpc), as found in A. Westfeld, "F5 a steganographic algorithm: High capacity despite better steganalysis," *4th International Workshop on Information Hiding*, Pittsburgh, Pa., USA, 2001; and (10a, 10b) OutGuess (0.1 and 0.2 bpc), as found in N. Provos, "Defending against statistical steganalysis," *10th USENIX Security Symposium*, Washington D.C., USA, 2001. As can be seen from the experimental results of Table 1, our exemplary embodiment provides improved performance over the background art methods for steganalysis for texture images in general.

TABLE 1

Results on 798 texture images (true negative rate/true positive rate/accuracy; in the unit of %).

| Steganographic Schemes | Fridrich* | Farid | Shi et al. | Chen et al. | Zou et al. | Shi et al. II | Exemplary Embodiment |
|---|---|---|---|---|---|---|---|
| (1) SSIS (40 dB, 0.1 bpp) | 78.2/96.7/87.4 | 94.7/97.2/95.9 | 79.3/88.7/84.0 | 95.0/96.0/95.5 | 85.2/88.2/86.7 | 95.5/96.1/95.8 | 96.17/97.37/96.77 |
| (2) Cox's SS | 59.8/54.0/56.9 | 47.4/59.1/53.3 | 49.8/77.3/63.6 | 69.8/69.7/69.8 | 60.0/64.8/62.4 | 58.9/58.7/58.8 | 79.96/80.83/80.39 |
| (3) Piva's SS | 66.0/65.5/65.7 | 59.4/64.4/61.9 | 62.8/82.4/72.6 | 81.2/81.7/81.4 | 66.4/76.4/71.4 | 68.8/70.1/69.4 | 89.29/90.71/90.00 |
| (4) Huang's SS | 92.7/92.2/92.4 | 70.9/74.1/72.5 | 72.3/90.3/81.3 | 84.7/84.6/84.6 | 73.3/77.6/75.5 | 75.8/78.2/77.0 | 92.11/93.38/92.74 |
| (5a) Generic LSB (0.1 bpp) | 64.7/56.1/60.4 | 53.7/55.5/54.6 | 53.0/60.5/56.8 | 65.2/67.7/66.4 | 55.4/57.3/56.4 | 65.2/66.9/66.0 | 74.32/78.42/76.37 |
| (5b) Generic LSB (0.3 bpp) | 67.1/76.2/71.7 | 60.6/67.0/63.8 | 68.0/80.4/74.2 | 77.0/78.5/77.8 | 71.2/75.5/73.3 | 71.5/73.6/72.6 | 86.95/90.56/88.76 |
| (6a) Generic LSB Modulation (0.1 bpp) | 66.8/58.5/62.7 | 57.0/49.4/53.2 | 49.5/62.1/55.8 | 66.1/66.8/66.4 | 52.9/58.0/55.5 | 62.1/64.0/63.0 | 71.92/79.85/75.88 |
| (6b) Generic LSB Modulation (0.3 bpp) | 69.3/71.4/70.3 | 62.2/66.2/64.2 | 65.0/78.1/71.6 | 79.5/79.1/79.3 | 64.3/68.5/66.4 | 71.1/72.5/71.8 | 83.23/88.65/85.94 |
| (7) Generic QIM (0.1 bpp) (Step5) | 100.0/100.0/100.0 | 96.5/97.1/96.8 | 66.9/84.7/75.8 | 98.0/97.4/97.7 | 66.2/71.1/68.6 | 99.7/99.9/99.8 | 99.40/99.74/99.57 |
| (8a) MB1 (0.1 bpc) | 65.1/71.5/68.3 | 59.0/47.0/53.0 | 47.3/58.0/52.6 | 62.2/62.6/62.4 | 54.1/53.0/53.6 | 82.2/85.7/84.0 | 70.15/71.50/70.83 |
| (8b) MB1 (0.2 bpc) | 81.5/83.9/82.7 | 56.0/58.8/57.4 | 52.3/59.1/55.7 | 74.2/77.6/75.9 | 60.3/57.1/58.7 | 95.5/96.5/96.0 | 86.88/88.46/87.67 |
| (9a) F5 (0.1 bpc) | 81.6/83.7/82.6 | 62.5/40.9/51.7 | 57.4/49.8/53.6 | 67.4/67.2/67.3 | 53.8/54.5/54.1 | 75.8/78.6/77.2 | 70.64/72.67/71.65 |
| (9b) F5 (0.2 bpc) | 96.3/96.7/96.5 | 63.4/54.8/59.1 | 62.6/58.6/60.6 | 85.1/87.4/86.3 | 59.7/60.7/60.2 | 90.8/94.7/92.7 | 89.40/90.75/90.08 |
| (10a) OutGuess (0.1 bpc) | 96.4/96.7/96.6 | 67.9/64.9/66.4 | 57.8/52.1/55.0 | 80.3/82.9/81.6 | 56.1/60.5/58.3 | 96.3/97.3/96.8 | 90.76/89.92/90.34 |
| (10b) OutGuess (0.2 bpc) | 99.8/99.8/99.8 | 80.2/80.2/80.2 | 58.8/60.2/59.5 | 92.7/93.8/93.2 | 66.4/68.2/67.3 | 98.5/99.9/99.2 | 96.76/97.11/96.93 |

(*The feature generation process fails (yielding non-acceptable values, i.e., "NaN" in Matlab) when applied to 18 out of 798 images. Therefore, these results are obtained from 780 images only.)
We randomly select 5/6 of the cover/stego image pairs to train the SVM classifier and the remaining 1/6 pairs to test the trained classifier. We apply Fridrich, Farid, Shi et al., Chen et al., Zou et al, Shi et al. II and our exemplary embodiment of the proposed steganalyzer in the same way to detect the above mentioned data hiding schemes. The results shown in Table 1 are the arithmetic average of 20 random experiments.

To evaluate the performance of an exemplary embodiment of the method for steganalysis of the invention on general smooth images, we also use all the 1096 sample images included in the CorelDraw™ Version 10.0 software for experiments. CorelDraw™ images are well known as natural images with good quality. The results shown in Table 2 are the arithmetic average of 20 random experiments. As can be seen from the experimental results of Table 2, our exemplary embodiment provides improved performance over the background art methods for steganalysis for smooth images in general.

TABLE 2

Results on 1096 CorelDraw ™ images (true negative rate/true positive rate/accuracy; in the unit of %)

| Steganographic Schemes | Fridrich | Farid | Shi et al. | Chen et al. | Zou et al. | Shi et al. II | Exemplary Embodiment |
|---|---|---|---|---|---|---|---|
| (1) SSIS (40 dB, 0.1 bpp) | 87.3/99.9/93.6 | 96.7/99.0/97.8 | 96.5/99.6/98.0 | 98.4/99.3/98.8 | 96.6/97.1/96.8 | 98.5/99.2/98.8 | 99.15/99.70/99.43 |
| (2) Cox's SS | 68.4/66.6/67.5 | 68.6/69.5/69.1 | 96.3/98.3/97.3 | 96.1/97.0/96.5 | 99.5/99.6/99.5 | 88.2/87.2/87.7 | 98.96/99.21/99.08 |
| (3) Piva's SS | 75.8/75.8/75.8 | 91.1/89.5/90.3 | 98.7/99.5/99.1 | 98.4/98.7/98.6 | 100.0/100.0/100.0 | 93.8/93.6/93.7 | 99.67/99.73/99.70 |
| (4) Huang's SS | 98.2/96.5/97.3 | 84.3/88.1/86.2 | 98.5/99.5/99.0 | 98.2/99.1/98.7 | 99.7/99.9/99.8 | 95.8/96.3/96.1 | 99.51/99.81/99.66 |
| (5a) Generic LSB (0.1 bpp) | 73.4/73.3/73.3 | 63.4/69.2/66.3 | 91.4/95.5/93.4 | 94.0/93.7/93.9 | 97.5/98.0/97.8 | 91.1/91.1/91.1 | 97.40/98.01/97.70 |
| (5b) Generic LSB (0.3 bpp) | 86.4/82.5/84.5 | 82.4/87.5/85.0 | 98.1/99.5/98.8 | 98.0/98.4/98.2 | 99.6/99.8/99.7 | 96.3/96.6/96.4 | 99.32/99.75/99.54 |
| (6a) Generic LSB Modulation (0.1 bpp) | 73.7/74.3/74.0 | 63.1/70.2/66.7 | 90.8/96.2/93.5 | 94.0/95.1/94.6 | 97.3/98.0/97.7 | 91.9/91.4/91.6 | 97.65/98.17/97.91 |
| (6b) Generic LSB Modulation (0.3 bpp) | 87.4/83.7/85.6 | 83.6/87.8/85.7 | 98.0/99.6/98.8 | 98.2/98.5/98.3 | 99.7/99.9/99.8 | 96.8/96.5/96.6 | 99.45/99.81/99.63 |
| (7) Generic QIM (0.1 bpp) (Step5) | 100.0/100.0/100.0 | 99.2/99.3/99.2 | 98.1/99.3/98.7 | 99.6/99.9/99.7 | 99.7/99.8/99.7 | 100.0/99.9/100.0 | 100.0/99.95/99.97 |
| (8a) MB1 (0.1 bpc) | 79.3/79.6/79.5 | 49.0/56.7/52.9 | 57.3/60.9/59.1 | 85.1/84.2/84.6 | 67.5/67.6/67.6 | 98.1/98.4/98.3 | 84.89/85.57/85.23 |
| (8b) MB1 (0.2 bpc) | 94.1/92.1/93.1 | 54.2/58.2/56.2 | 67.1/69.5/68.3 | 95.7/94.3/95.0 | 80.4/82.5/81.4 | 99.8/100.0/99.9 | 96.53/96.26/96.39 |
| (9a) F5 (0.1 bpc) | 84.0/82.9/83.5 | 46.2/59.9/53.0 | 57.9/52.5/55.2 | 72.9/74.5/73.7 | 63.0/61.7/62.4 | 80.4/80.1/80.2 | 74.26/74.51/74.38 |
| (9b) F5 (0.2 bpc) | 98.0/95.6/96.8 | 57.1/60.3/58.7 | 64.9/64.2/64.6 | 92.0/93.4/92.7 | 74.5/76.2/75.3 | 95.1/96.3/95.7 | 93.35/93.82/93.59 |
| (10a) OutGuess (0.1 bpc) | 98.0/97.8/97.9 | 72.8/71.3/72.1 | 59.3/67.1/63.2 | 92.9/93.3/93.1 | 75.6/74.7/75.1 | 99.6/99.8/99.7 | 95.03/96.01/95.52 |
| (10b) OutGuess (0.2 bpc) | 99.7/99.9/99.8 | 85.1/85.5/85.3 | 70.7/74.8/72.8 | 97.5/98.0/97.8 | 85.6/86.9/86.2 | 100.0/100.0/100.0 | 99.01/99.29/99.15 |

We randomly select 5/6 of the cover/stego image pairs to train the SVM classifier and the remaining 1/6 pairs to test the trained classifier. We apply Fridrich, Farid, Shi et al., Chen et al., Zou et al, Shi et al. II and our exemplary embodiment of a proposed steganalyzer in the same way to detect the above mentioned data hiding schemes. The results shown in Table 2 are the arithmetic average of 20 random experiments.

Tests were also conducted to examine the effect on performance due to various block sizes. Specifically, the performance of an embodiment of the invention was tested without using features generated from 16×16 BDCT coefficient 2-D array. The results of the test are shown in Table 3 and are the arithmetic average of 20 random experimental results. From Table 3, it is observed that features from 16×16 BDCT have enhanced the detection rates by 5% to 10% (except when the detection rate has already been above 95%) in detecting steganography in a JPEG image. We randomly select 5/6 of the cover/stego image pairs to train the SVM classifier and the remaining 1/6 pairs to test the trained classifier. We apply our exemplary embodiment of a steganalyzer and a steganalyzer without features generated from 16×16 BDCT coefficient 2-D array in the same way to detect the above mentioned data hiding schemes. The results shown in Table 3 are the arithmetic average of 20 random experiments.

TABLE 3

Results on 798 texture images (true negative rate/true positive rate/accuracy; in the unit of %)

| Steganographic Schemes | Exemplary Embodiment | Without 16 × 16 BDCT |
|---|---|---|
| (1) SSIS (40 dB, 0.1 bpp) | 96.17/97.37/96.77 | 95.86/96.95/96.41 |
| (2) Cox's SS | 79.96/80.83/80.39 | 78.38/80.60/79.49 |
| (3) Piva's SS | 89.29/90.71/90.00 | 88.98/91.62/90.30 |
| (4) Huang's SS | 92.11/93.38/92.74 | 92.03/94.74/93.38 |
| (5a) Generic LSB (0.1 bpp) | 74.32/78.42/76.37 | 73.76/78.80/76.28 |
| (5b) Generic LSB (0.3 bpp) | 86.95/90.56/88.76 | 86.92/90.83/88.87 |
| (6a) Generic LSB Modulation (0.1 bpp) | 71.92/79.85/75.88 | 71.43/78.35/74.89 |
| (6b) Generic LSB Modulation (0.3 bpp) | 83.23/88.65/85.94 | 81.77/89.92/85.85 |
| (7) Generic QIM (0.1 bpp) (Step5) | 99.40/99.74/99.57 | 99.32/98.95/99.14 |
| (8a) MB1 (0.1 bpc) | 70.15/71.50/70.83 | 60.15/62.86/61.50 |
| (8b) MB1 (0.2 bpc) | 86.88/88.46/87.67 | 75.08/78.46/76.77 |
| (9a) F5 (0.1 bpc) | 70.64/72.67/71.65 | 63.27/65.41/64.34 |
| (9b) F5 (0.2 bpc) | 89.40/90.75/90.08 | 82.71/85.34/84.02 |
| (10a) OutGuess (0.1 bpc) | 90.76/89.92/90.34 | 83.74/84.54/84.14 |
| (10b) OutGuess (0.2 bpc) | 96.76/97.11/96.93 | 94.18/96.91/95.55 |

An exemplary embodiment of the invention uses 270-D features. The first 54 feature vector components are derived from the spatial representation. The second, third, fourth, and fifth are derived from BDCT representation with block size 2×2, 4×4, 8×8 (alternatively, for a JPEG coefficient 2-D array for JPEG images at 8×8 BDCT), and 16×16, respectively. Experimental results using part of and all of these features are given in Table 4. In this table, "54-D" means only the first 54 feature components are used, "108-D" means the first and the second 54 feature components are used, and so on.

TABLE 4

Results on 798 texture images (the area under the receiver operating characteristics (ROC) curve (AUC), according to T. Fawcett, "Roc graphs: notes and practical considerations for researchers")

| Steganographic Schemes | 54-D | 108-D | 162-D | 216-D | 270-D |
|---|---|---|---|---|---|
| (1) SSIS (40 dB, 0.1 bpp) | 0.8423 | 0.8874 | 0.9604 | 0.9829 | 0.9853 |
| (2) Cox's SS | 0.7370 | 0.7789 | 0.8190 | 0.8558 | 0.8591 |
| (3) Piva's SS | 0.7688 | 0.8371 | 0.9051 | 0.9374 | 0.9367 |
| (4) Huang's SS | 0.8641 | 0.9079 | 0.9420 | 0.9692 | 0.9693 |
| (5a) Generic LSB (0.1 bpp) | 0.6665 | 0.7163 | 0.7635 | 0.8129 | 0.8173 |

TABLE 4-continued

Results on 798 texture images (the area under the receiver operating characteristics (ROC) curve (AUC), according to T. Fawcett, "Roc graphs: notes and practical considerations for researchers")

| Steganographic Schemes | 54-D | 108-D | 162-D | 216-D | 270-D |
|---|---|---|---|---|---|
| (5b) Generic LSB (0.3 bpp) | 0.8831 | 0.9179 | 0.9332 | 0.9393 | 0.9391 |
| (6a) Generic LSB Modulation (0.1 bpp) | 0.5877 | 0.6327 | 0.7196 | 0.7931 | 0.8017 |
| (6b) Generic LSB Modulation (0.3 bpp) | 0.7662 | 0.8116 | 0.8862 | 0.9059 | 0.9095 |
| (7) Generic QIM (0.1 bpp) (Step5) | 0.7974 | 0.8579 | 0.9098 | 0.9900 | 0.9914 |
| (8a) MB1 (0.1 bpc) | 0.5368 | 0.5275 | 0.5504 | 0.6531 | 0.7566 |
| (8b) MB1 (0.2 bpc) | 0.5552 | 0.5750 | 0.6173 | 0.8235 | 0.9141 |
| (9a) F5 (0.1 bpc) | 0.5345 | 0.5370 | 0.5474 | 0.6758 | 0.7481 |
| (9b) F5 (0.2 bpc) | 0.5621 | 0.5682 | 0.6203 | 0.8873 | 0.9408 |
| (10a) OutGuess (0.1 bpc) | 0.5459 | 0.5542 | 0.5794 | 0.8976 | 0.9382 |
| (10b) OutGuess (0.2 bpc) | 0.6056 | 0.6124 | 0.6884 | 0.9703 | 0.9766 |

It is observed from the above results that each of the BDCT's makes contribution to our proposed steganalyzer. Moreover, the more the different BDCT sizes (up to 16×16) involved, the better the steganalysis performance. In other words, each feature subset associated with the specific-block-size BDCT contributes to the steganalyzer, just like each reflected signal contributes to the RAKE receiver to improve the received SNR (signal to noise ratio), which is widely used in wireless communication applications. We refer to this series of BDCT's as a RAKE transform. For steganographic methods applied to image spatial representation, it seems that the steganalyzer gives similar performance with 16×16 BDCT to that without 16×16 BDCT. However, 16×16 BDCT enhances the steganalyzer's performance on JPEG images significantly.

Our experimental results show that features generated from block DCT coefficient 2-D array with block size 2, 4, or 8 also make a contribution that improves the effectiveness of steganalysis significantly. However, block DCT coefficient 2-D arrays with block size larger than 16 contribute much less to improving performance. This is expected because the correlation between image pixels reduces dramatically when the distance between pixels is large, as is the case for block sizes larger than 16.

From the experimental results we conclude the following: (1) exemplary embodiments of the invention significantly improve the capability for steganalysis in detecting steganography that has been applied to the texture images in the spatial representation; (2) the exemplary embodiment also works quite well on general smooth images (e.g., the CorelDraw™ images); (3) a large number of experimental results indicate the exemplary embodiment outperforms background art universal steganalyzers in detecting steganography applied to both texture images and general smooth images; (4) the exemplary embodiment outperforms the background art universal steganalyzers (e.g., Farid, Shi et al) in detecting data hidden in JPEG images by a significant margin. Though the exemplary embodiment does not perform better in detecting modern JPEG steganographic schemes such as MB1, F5, and OutGuess than some steganalyzers (e.g., Fridrich and Shi et al II), these steganalyzers were specifically designed for detecting these modern JPEG steganographic schemes and perform poorly in steganalyzing steganographic schemes applied to images in spatial representation. In addition, these steganalyzers (e.g., Fridrich) sometimes cannot be carried out for all of 798 texture images in our experiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for steganalysis of an image comprising:
performing a JPEG decompression of an inputted JPEG representation of the image;
reconstructing a spatial representation of the image from the JPEG decompression;
performing entropy decoding of the JPEG representation, to obtain an entropy decoded JPEG representation;
re-ordering the entropy decoded JPEG representation, to obtain a re-ordered entropy decoded JPEG representation;
generating multiple non-overlapping, N×N block decompositions of the spatial representation of the image;
applying block discrete cosine transform (BDCT) to each of the non-overlapping, N×N block decompositions to determine corresponding BDCT coefficient two-dimensional (2-D) arrays;
forming one or more 8×8 JPEG coefficient arrays from the re-ordered entropy decoded JPEG representation;
extracting moments using characteristic functions derived based on the spatial representation of the image the BDCT coefficient 2-D arrays, and the one or more 8×8 JPEG coefficient 2-D arrays, to obtain extracted moments;

generating features based at least on the extracted moments, to obtain generated features;

classifying the image based at least on the generated features; and determining a prediction error array for at least one of the spatial representation of the image, the BDCT coefficient 2-D arrays, or the JPEG coefficient 2-D arrays, wherein determining the prediction error array comprises computing a sign and a magnitude corresponding to a respective element of at least one of the spatial representation of the image, the BDCT coefficient 2-D arrays, or JPEG coefficient 2-D arrays, wherein computing a magnitude comprises computing an expression $|a|+|b|-|c|$, wherein a, b, and c correspond to elements neighboring the respective element; obtaining the sign of the at least one element; and computing the product of the sign and the expression to obtain a prediction corresponding to the respective element.

2. The method of claim 1, further comprising obtaining a 2-D array of 8×8 block size, JPEG quantized coefficients for moment extraction when the image is a JPEG representation.

3. The method of claim 1, further comprising computing a discrete wavelet transform for at least one of the spatial representation of the image, the BDCT coefficient 2-D arrays, the JPEG coefficient 2-D arrays, or the prediction error array.

4. The method of claim 3, wherein the discrete wavelet transform is at least one of a Daubechies 9/7 wavelet and an integer 5/3 wavelet.

5. The method of claim 3, wherein the discrete wavelet transform is one of a 1, 2 or 3 level wavelet transform.

6. The method of claim 3, wherein the wavelet transform is at least a 1-level discrete wavelet transform.

7. The method of claim 6, wherein the wavelet transform is a Haar wavelet transform.

8. The method of claim 7, further comprising determining histograms corresponding to one or more wavelet subbands, wherein the wavelet subbands include low-low subbands.

9. The method of claim 1, further comprising determining at least one of horizontal, vertical, diagonal or minor diagonal histograms from at least one of the spatial representation of the image, the BDCT coefficient 2-D arrays or JPEG coefficient 2-D arrays.

10. The method of claim 9, wherein extracting moments further comprises applying at least one discrete Fourier transform (DFT) to at least one of the histograms.

11. The method of claim 10, further comprising determining at least one of first order, second order, or third order moments from the at least one DFT.

12. The method of claim 1, wherein determining the prediction error array comprises computing, for each element of the at least one of the spatial representation of the image, the BDCT coefficient 2-D arrays, and the JPEG coefficient 2-D arrays, a prediction error as a difference between the prediction corresponding to the element and the element.

13. A method for steganalysis of an image comprising:

generating multiple non-overlapping, N×N block decompositions of a two-dimensional (2-D) spatial representation of the image;

applying N×N block discrete cosine transforms (BDCT) to each of the non-overlapping, N×N block decompositions, to obtain a BDCT 2-D coefficient array corresponding to each N×N block;

extracting moments using characteristic functions derived based on the spatial representation of the image and each of the BDCT coefficient 2-D arrays, to obtain extracted moments;

generating features based at least on the extracted moments, to obtain generated features; and classifying the image based at least on the generated features; and determining a prediction error array for at least one of the spatial representation of the image or the BDCT coefficient 2-D arrays, wherein determining the prediction error array comprises computing a sign and a magnitude corresponding to a respective element of at least one of the spatial representation of the image or the BDCT coefficient 2-D arrays, wherein computing a magnitude comprises computing an expression $|a|+|b|-|c|$, wherein a, b, and c correspond to elements neighboring the respective element; obtaining the sign of the at least one element; and computing the product of the sign and the expression to obtain a prediction corresponding to the respective element.

14. The method of claim 13, wherein the block size N is at least one of 2, 4, 8 and 16.

15. The method of claim 13, further comprising computing a discrete wavelet transform for at least one of the spatial representation of the image, the BDCT coefficient 2-D arrays, or the prediction error array.

16. The method of claim 15, wherein the discrete wavelet transform is at least one of a Daubechies 9/7 wavelet and an integer 5/3 wavelet.

17. The method of claim 15, wherein the discrete wavelet transform is one of a 1, 2 or 3 level wavelet transform.

18. The method of claim 15, wherein the wavelet transform is at least a 1-level discrete wavelet transform.

19. The method of claim 18, wherein the wavelet transform is a Haar wavelet transform.

20. The method of claim 19, further comprising determining histograms corresponding to one or more wavelet subbands, wherein the wavelet subbands include low-low subbands.

21. The method of claim 13, further comprising determining at least one of horizontal, vertical, diagonal or minor diagonal histograms from at least one of the spatial representation of the image or the BDCT coefficient 2-D arrays.

22. The method of claim 21, wherein extracting moments further comprises applying at least one discrete Fourier transform (DFT) to at least one of the histograms.

23. The method of claim 22, further comprising determining at least one of first order, second order, or third order moments from the at least one DFT.

24. The method of claim 13, wherein determining the prediction error array comprises computing, for each element of the at least one of the spatial representation of the image, the BDCT coefficient 2-D arrays, and the JPEG coefficient 2-D arrays, a prediction error as a difference between the prediction corresponding to the element and the element.

25. A non-transitory processor-readable storage medium containing software code that, upon execution by a computing device, causes the computing device to implement a set of operations for steganalysis of an image, the operations comprising:

generating multiple non-overlapping, N×N block decompositions of a two-dimensional (2-D) spatial representation of the image;

applying N×N block discrete cosine transforms (BDCT) to each of the non-overlapping, N×N block decompositions, to obtain a BDCT 2-D coefficient array corresponding to each N×N block;

extracting moments using characteristic functions derived based on the spatial representation of the image and each of the BDCT coefficient 2-D arrays, to obtain extracted moments;

generating features based at least on the extracted moments, to obtain generated features; and classifying the image based at least on the generated features; and determining a prediction error array for at least one of the spatial representation of the image or the BDCT coefficient 2-D arrays, wherein determining the prediction error array comprises computing a sign and a magnitude corresponding to a respective element of at least one of the spatial representation of the image or the BDCT coefficient 2-D arrays, wherein computing a magnitude comprises computing an expression $|a|+|b|-|c|$, wherein a, b, and c correspond to elements neighboring the respective element; obtaining the sign of the at least one element; and computing the product of the sign and the expression to obtain a prediction corresponding to the respective element.

26. The processor-readable storage medium of claim 25, wherein the operations further comprise:

computing a discrete wavelet transform for at least one of the spatial representation of the image, the BDCT coefficient 2-D arrays, or the prediction error array;

determining histograms of wavelet subbands obtained by computing the discrete wavelet transforms, wherein the wavelet subbands include low-low subbands;

determining at least one of horizontal, vertical, diagonal or minor diagonal histograms from at least one of the spatial representation of the image or the BDCT coefficient 2-D arrays;

determining at least one of first order, second order, or third order moments from a discrete Fourier transform (DFT) of the at least one histogram, wherein the wavelet transform is at least a 1-level discrete wavelet transform, and wherein the wavelet transform is a Haar wavelet transform.

27. The processor-readable storage medium of claim 25, wherein the operations further comprise:

computing a discrete wavelet transform for at least one of the spatial representation of the image, the BDCT coefficient 2-D arrays, the JPEG coefficient 2-D arrays or the prediction error array;

determining histograms of wavelet subbands obtained by computing the discrete wavelet transforms, wherein the wavelet subbands include low-low subbands;

determining at least one of horizontal, vertical, diagonal or minor diagonal histograms from at least one of the spatial representation of the image, the BDCT coefficient 2-D arrays or JPEG coefficient 2-D arrays;

determining at least one of first order, second order, or third order moments from a discrete Fourier transform (DFT) of the at least one histogram, wherein the wavelet transform is at least a 1-level discrete wavelet transform, and wherein the wavelet transform is a Haar wavelet transform.

28. A non-transitory processor-readable storage medium containing software code that, upon execution by a computing device, causes the computing device to implement a set of operations for steganalysis of an image, the operations comprising:

performing a JPEG decompression of an inputted JPEG representation of the image;

reconstructing a spatial representation of the image from the JPEG decompression;

performing entropy decoding of the JPEG representation, to obtain an entropy decoded JPEG representation;

re-ordering the entropy decoded JPEG representation, to obtain a re-ordered entropy decoded JPEG representation;

generating multiple non-overlapping, N×N block decompositions of the spatial representation of the image;

applying block discrete cosine transform (BDCT) to each of the non-overlapping, N×N block decompositions to determine corresponding BDCT coefficient two-dimensional (2-D) arrays;

forming one or more 8×8 JPEG coefficient arrays from the re-ordered entropy decoded JPEG representation;

extracting moments using characteristic functions derived based on the spatial representation of the image, the BDCT coefficient 2-D arrays, and the one or more 8×8 JPEG coefficient 2-D arrays, to obtain extracted moments;

generating features based at least on the extracted moments, to obtain generated features;

classifying the image based at least on the generated features; and determining a prediction error array for at least one of the spatial representation of the image, the BDCT coefficient 2-D arrays, or the JPEG coefficient 2-D arrays, wherein determining the prediction error array comprises computing a sign and a magnitude corresponding to a respective element of at least one of the spatial representation of the image, the BDCT coefficient 2-D arrays, or JPEG coefficient 2-D arrays, wherein computing magnitude comprises computing an expression $|a|+|b|-|c|$, wherein a, b, and c correspond to elements neighboring the respective element; obtaining the sign of the at least one element; and computing the product of the sign and the expression to obtain a prediction corresponding to the respective element.

29. An apparatus comprising:

means for generating multiple non-overlapping, N×N block decompositions of a two-dimensional (2-D) spatial representation of an input image;

means for applying N×N block discrete cosine transforms (BDCT) to each of the non-overlapping, N×N block decompositions, to obtain a BDCT 2-D coefficient array corresponding to each N×N block;

means for extracting moments using characteristic functions derived based on the spatial representation of the image and each of the BDCT coefficient 2-D arrays, to obtain extracted moments;

means for generating features based at least on the extracted moments, to obtain generated features;

means for classifying the image based at least on the generated features; and means for determining a prediction error array for at least one of the spatial representation of the image or the BDCT coefficient 2-D arrays, wherein the means for determining the prediction error array comprises means for computing a sign and a magnitude corresponding to a respective element of at least one of the spatial representation of the image or the BDCT coefficient 2-D arrays, wherein the means for computing a sign and a magnitude comprises means for computing an expression $|a|+|b|-|c|$, wherein a, b, and c correspond to elements neighboring the respective element; for obtaining the sign of the at least one element; and for computing the product of the sign and the expression to obtain a prediction corresponding to the respective element.

30. The apparatus of claim 29, wherein said means for classifying comprises a means for classifying an image as either a stego-image or a non-stego image.

31. The apparatus of claim 29, further comprising means for applying a set of features based on training data to train said means for classifying.

32. The apparatus of claim 29, wherein said means for classifying comprises at least one of a Support Vector Machine (SVM) classifier, a neural network classifier or a Bayes classifier.

33. An apparatus comprising:
   means for performing a JPEG decompression of an inputted JPEG representation of an image;
   means for reconstructing a spatial representation of the image from the JPEG decompression;
   means for performing entropy decoding of the JPEG representation, to obtain an entropy decoded JPEG representation;
   means for re-ordering the entropy decoded JPEG representation, to obtain a re-ordered entropy decoded JPEG representation;
   means for generating multiple non-overlapping, N×N block decompositions of the spatial representation of the image;
   means for applying block discrete cosine transform (BDCT) to each of the non-overlapping, N×N block decompositions to determine corresponding BDCT coefficient two-dimensional (2-D) arrays;
   means for forming one or more 8×8 JPEG coefficient arrays from the re-ordered entropy decoded JPEG representation;
   means for extracting moments using characteristic functions derived based on the spatial representation of the image, the BDCT coefficient 2-D arrays, and the one or more 8×8 JPEG coefficient 2-D arrays, to obtain extracted moments;
   means for generating features based at least on the extracted moments, to obtain generated features;
   means for classifying the image based at least on the generated features; and
   means for determining a prediction error array for at least one of the spatial representation of the image the BDCT coefficient 2-D arrays, or the JPEG coefficient 2-D arrays, wherein determining the prediction error array comprises computing a sign and a magnitude corresponding to a respective element of at least one of the spatial representation of the image, the BDCT coefficient 2-D arrays, or JPEG coefficient 2-D arrays, wherein computing a magnitude comprises computing an expression $|a|+|b|-|c|$, wherein a, b, and c correspond to elements neighboring the respective element; obtaining the sign of the at least one element; and computing the product of the sign and the expression to obtain a prediction corresponding to the respective element.

34. The apparatus of claim 33, wherein said means for classifying comprises a means for classifying an image as either a stego-image or a non-stego image.

35. The apparatus of claim 33, further comprising means for applying a set of features based on training data to train said means for classifying.

36. The apparatus of claim 33, wherein said means for classifying comprises at least one of a Support Vector Machine (SVM) classifier, a neural network classifier or a Bayes classifier.

* * * * *